US008775528B2

United States Patent
Takahashi et al.

(10) Patent No.: US 8,775,528 B2
(45) Date of Patent: Jul. 8, 2014

(54) COMPUTER READABLE RECORDING MEDIUM STORING LINKING KEYWORD AUTOMATICALLY EXTRACTING PROGRAM, LINKING KEYWORD AUTOMATICALLY EXTRACTING METHOD AND APPARATUS

(75) Inventors: Hidekazu Takahashi, Kawasaki (JP); Motoyuki Kawaba, Kawasaki (JP); Yuuji Hotta, Kawasaki (JP); Lilian Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 659 days.

(21) Appl. No.: 12/435,171

(22) Filed: May 4, 2009

(65) Prior Publication Data
US 2010/0042686 A1 Feb. 18, 2010

(30) Foreign Application Priority Data
Aug. 12, 2008 (JP) ................................. 2008-207889

(51) Int. Cl.
*G06F 15/16* (2006.01)

(52) U.S. Cl.
USPC .......................................... 709/206; 709/205

(58) Field of Classification Search
CPC ....... G06Q 30/02; G06Q 10/08; G06Q 20/02; G06Q 20/4014; G06Q 20/12; G06Q 20/385; G06Q 20/04
USPC ................................................... 709/205, 206
See application file for complete search history.

(56) References Cited

U.S. PATENT DOCUMENTS

2003/0038707 A1* 2/2003 Geller ............................ 340/5.8
2006/0178994 A1* 8/2006 Stolfo et al. .................... 705/50

FOREIGN PATENT DOCUMENTS

JP A 9-330335 12/1997

* cited by examiner

*Primary Examiner* — David X Yi
(74) *Attorney, Agent, or Firm* — Fujitsu Patent Center (57) ABSTRACT

A character string which is unique in each transaction and a character string common to different transactions are extracted from a message log obtained when the same transaction is processed for a plurality of number of times. Then, messages stored by practically operating an information system are associated with each transaction by utilizing these character strings, and the character string common to the transactions of which execution times overlap with each other is deleted, so that the remained character strings are provided as linking keywords.

4 Claims, 12 Drawing Sheets

MESSAGE LOG#1

```
000  protoA ... ... ...  1=T100 ... ...
001  protoB ...  1=T100 ... ... ... ...
002  protoD ... ... ... ... ...  1=10000
003  protoD ... ... ... ... ...  1=10000
004  protoC ... ... ...  3=T100 ...  4=10000
```

MESSAGE LOG#2

```
000  protoA ... ... ...  1=T101 ... ...
001  protoB ...  1=T101 ... ... ... ...
002  protoD ... ... ... ... ...  1=10000
003  protoD ... ... ... ... ...  1=10000
004  protoC ... ... ...  3=T101 ...  4=10000
```

FIG. 5

| Seq.id | protocol | KEYWORD ([field #id]=[val]) |
|--------|----------|------------------------------|
| 000 | protoA | 1=T100  2=A1  3=B  4=12 |
| 001 | protoB | 1=T100  2=AA |
| 002 | protoC | 1=2008  2=6  3=T100  4=10000 |
| 003 | protoD | 1=10000  2=1 |
| 004 | protoD | 1=10000  2=2 |
| 005 | protoB | 1=T100  2=AA |
| 006 | protoA | 1=T100  2=A2  3=B  4=13 |

FIG. 6

| Seq.id | protocol | KEYWOARD ([field #id]=[val]) | |
|---|---|---|---|
| 000 | protoA | 1=T100  2=A1  3=B  4=12 | DELETE |
| 001 | protoB | 1=T100  2=AA | |
| 002 | protoC | 1=2008  2=6  3=T100  4=10000 | |
| 003 | protoD | 1=10000  2=1 | |
| 004 | protoD | 1=10000  2=2 | |
| 005 | protoB | 1=T100  2=AA | |
| 006 | protoA | 1=T100  2=A2  3=B  4=13 | |

FIG. 7

| Seq.id | protocol | KEYWORD ([field #id]=[val]) |
|---|---|---|
| 000 | protoA | 1=T100 |
| 001 | protoB | 1=T100 |
| 002 | protoC | 3=T100  4=10000 |
| 003 | protoD | 1=10000 |
| 004 | protoD | 1=10000 |
| 005 | protoB | 1=T100 |
| 006 | protoA | 1=T100 |

FIG. 8

TRANSACTION1

| Seq.id | protocol | KEYWORD ([field #id]=[val]) |
|---|---|---|
| 000 | protoA | 1=T100 |
| 001 | protoB | 1=T100 |
| 002 | protoC | 3=T100  4=10000 |
| 003 | protoD | 1=10000 |
| 004 | protoD | 1=10000 |
| 005 | protoB | 1=T100 |
| 006 | protoA | 1=T100 |

TRANSACTION2

| Seq.id | protocol | KEYWORD ([field #id]=[val]) |
|---|---|---|
| 000 | protoA | 1=T101 |
| 001 | protoB | 1=T101 |
| 002 | protoC | 3=T101  4=10000 |
| 003 | protoD | 1=10000 |
| 004 | protoD | 1=10000 |
| 005 | protoB | 1=T101 |
| 006 | protoA | 1=T101 |

FIG. 9

| protocol | Uniq. [field #id] | Sess. [field #id] |
|---|---|---|
| protoA | 1 | |
| protoB | 1 | |
| protoC | 3 | 4 |
| protoD | | 1 |

| id | PROCESS STARTING DATE AND TIME | PROCESS ENDING DATE AND TIME | AVAILABLE LINKING KEYWORD |
|---|---|---|---|
| #0 | 2007-4-22 10:00:00 | 2007-4-22 10:00:01 | protoC:4=10000, protoD:1=10000... |
| #1 | 2007-4-22 10:00:05 | 2007-4-22 10:00:09 | protoC:4=10001, protoD:1=10001... |
| #2 | 2007-4-22 10:00:06 | 2007-4-22 10:00:07 | protoC:4=10000, protoD:1=10000... |
| #3 | 2007-4-22 10:00:15 | 2007-4-22 10:00:16 | protoC:4=10000, protoD:1=10000... |
| ... | ... | ... | ... |

COMPUTER READABLE RECORDING MEDIUM STORING LINKING KEYWORD AUTOMATICALLY EXTRACTING PROGRAM, LINKING KEYWORD AUTOMATICALLY EXTRACTING METHOD AND APPARATUS

CROSS-REFERENCE TO RELATED APPLICATION

This application is based upon and claims the benefit of priority of the prior Japanese Patent Application No. 2008-207889, filed on Aug. 12, 2008, the entire contents of which are incorporated herein by reference.

FIELD

The embodiment discusses herein is directed to a technology for automatically extracting linking keywords capable of associating network messages (to be referred to as "messages", hereunder) which are transmitted/received among servers, with each transaction.

BACKGROUND

Many of information systems, such as an electronic commerce system and the like, are constructed by using a plurality of servers such as a three-hierarchical system and the like. In such information systems, transactions are processed while repetitively transmitting and receiving messages among servers. The messages transmitted and received among the servers contain character strings such as a session ID, a transaction ID and the like, as transaction information common to each transaction unit. Accordingly, by utilizing these character strings, it is possible to perform "a linking process" of associating the messages transmitted and received among servers, with each transaction, and consequently, behavior monitoring of the information system, delay analysis of transaction execution, and the like can be performed.

In a conventional linking process, a character string retrieving tool, such as a grep command, is repetitively and manually applied to the messages transmitted and received among the servers in accordance with the transaction execution, so that the character string (linking keyword) contained commonly in the messages is specified. However, since a process of specifying the linking keyword is manually performed, a large number of man-hour is required, and thus, a management cost may be increased. Therefore, for the purpose of partitioning received messages, there has been proposed a technology for automatically extracting a keyword common to a plurality of received messages in the same partition.

As linking keywords for messages, it is necessary to utilize not only a unique character string for each transaction, such as the transaction ID, but also the same character string appearing plenty of times in the transactions which do not temporally overlap with each other, such as the session ID. However, in the conventionally proposed technology, since only the keyword common to the plurality of received messages in the same partition is extracted, the linking process utilizing the session ID is not performed, and consequently, it is difficult to link the messages for each transaction.

SUMMARY

According to an aspect of the embodiment, a message log in which messages transmitted and received among a plurality of servers are stored for each transaction by the same transaction being processed for a plurality of number of times in an information system that processes transactions while transmitting and receiving the messages among the servers, is referred to. Then, as linking keywords for associating the messages with each transaction, a first character string which is unique for each transaction and a second character string which is common to different transactions, are extracted. Next, a message log in which the messages are sequentially stored in accordance with a practical operation of the information system, is referred to, and the linking for associating the messages stored in the message log with each transactions is performed by utilizing the first and second character strings. Then, a character string common to the transactions of which execution times overlap with each other, is deleted from the second character strings, and the finally remained first and second character strings are provided as the linking keywords.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

Figure 1:
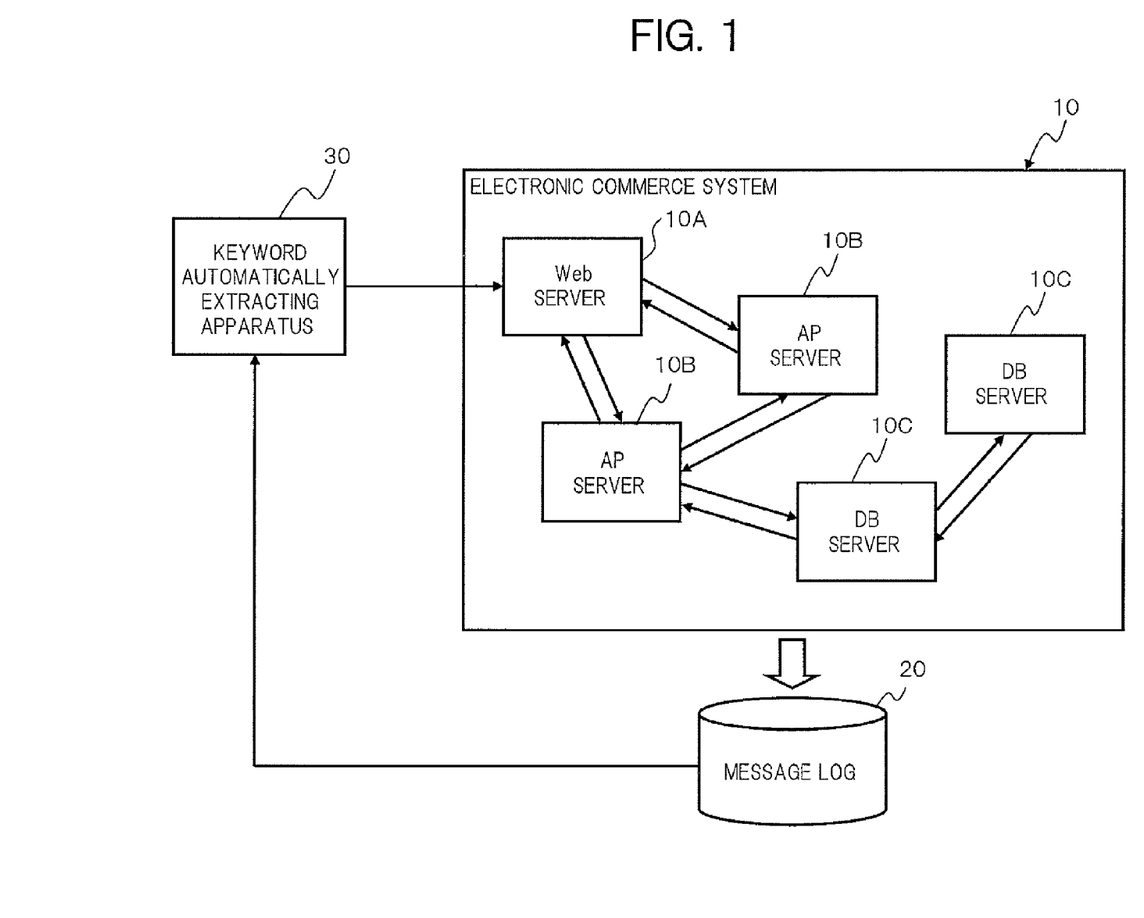
FIG. 1 is a block diagram illustrating one embodiment of a keyword automatically extracting apparatus.

FIG. 1 illustrates one embodiment of a linking keyword automatically extracting apparatus (to be referred to as "keyword automatically extracting apparatus", hereunder).

Figure 2:
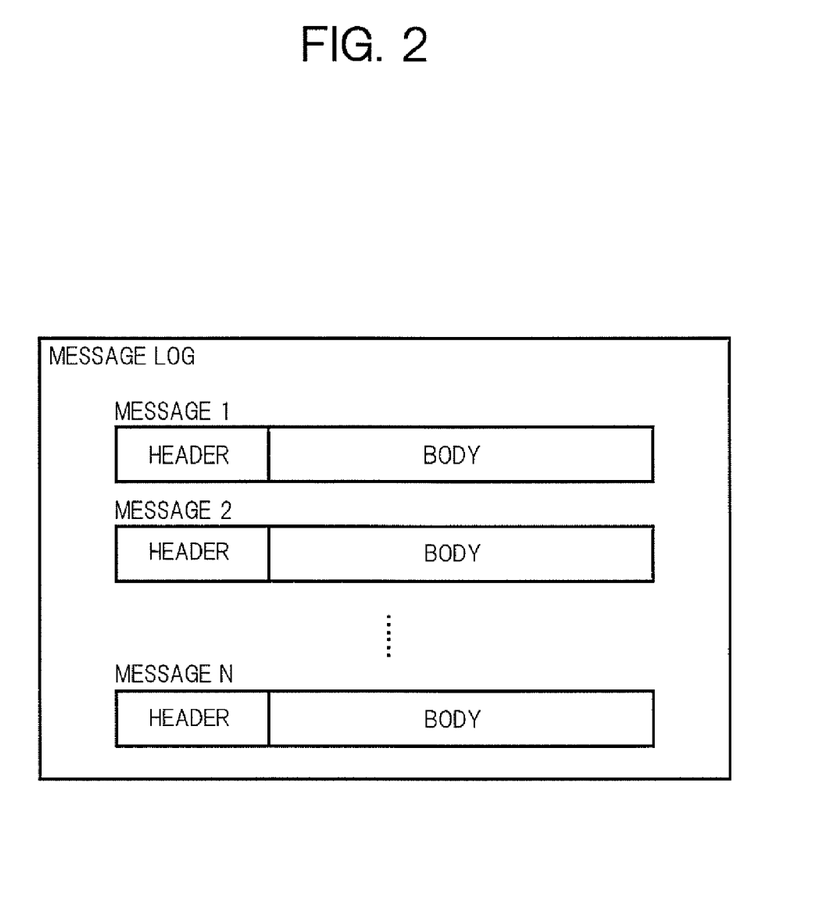
FIG. 2 is an explanatory view of a message log.

An electronic commerce system 10 which is one example of an objective of linking keyword extraction is constructed as a three-hierarchical system including a Web server 10A, AP (application) servers 10B and DB (database) servers 10C. When one transaction is processed in the electronic commerce system 10, messages transmitted and received among the Web server 10A, the AP servers 10B and the DB servers 10C are sequentially stored in an external storage device 20 such as DB, as a message log of text format as illustrated in FIG. 2.

Each message in the message log includes a "header" set with at least a time-stamp and a protocol, and a "body" described with an entity of the message in a character string format of "[field#id]=[val]". A plurality of message entities can be described into the body by using predetermined separating characters (for example, a space and the like). [field#id] indicating a part of the message entity has a value defined separately for each protocol. Further, in the same protocols in one transaction, [val], which is continued from [field#id], indicating the part of the message entity has all the same value.

A keyword automatically extracting apparatus 30 is constructed by using a general-purpose computer, and executes a linking keyword automatically extracting program installed in an external storage device such as a hard disk of the general-purpose computer to thereby implement two steps relating to the linking keyword extraction.

Figure 3:
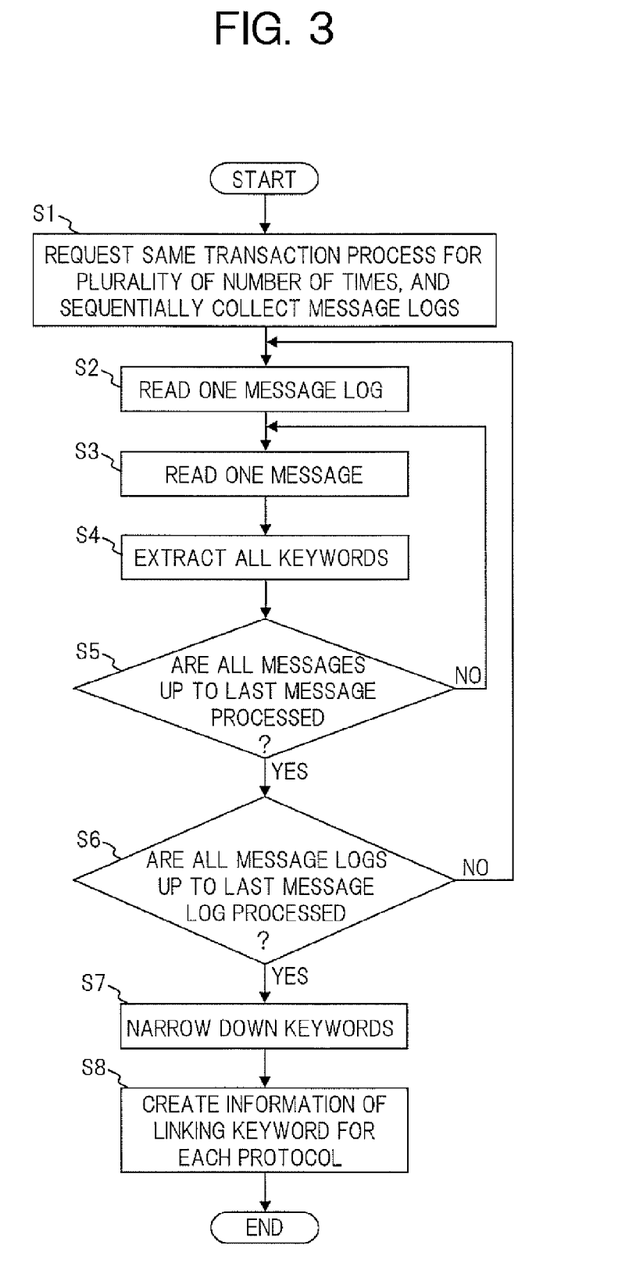
FIG. 3 is a flowchart illustrating a process content of a first step relating to linking keyword extraction.

FIG. 3 illustrates a process content of a first step executed in accordance with an instruction of a system administrator or the like, when the transaction is not processed in the electronic commerce system 10. Incidentally, the first step is executed in the keyword automatically extracting apparatus 30, so that keyword extracting means is provided.

Figure 4:
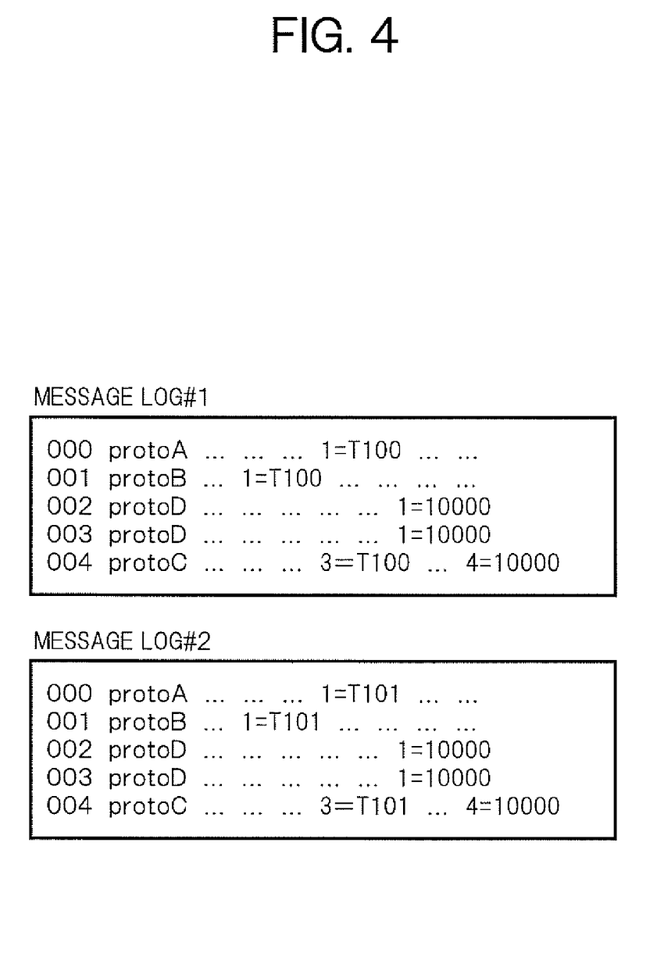
FIG. 4 is an explanatory view of message logs collected in a first step.

In step 1 (to be abbreviated as S1, and the same rule will be applied to the subsequent steps), the same transaction process is requested for a plurality of number of times to the Web server 10A of the electronic commerce system 10, and as illustrated in FIG. 4, a plurality of message logs being the process results are sequentially collected in the external storage device 20. To each message log, messages each associated with at least a sequence number (Seq.id) for identifying the message, a character string (protocol) for discriminating between the protocols and a character string ([field#id]=[val]) indicating the message entity are registered. Incidentally, FIG. 4 illustrates a state where two message logs are collected, but the number of message logs may be three or more.

In step 2, one message log is read in time-series from the external storage device 20.

In step 3, one message is read in time-series from the message log.

Figure 5:
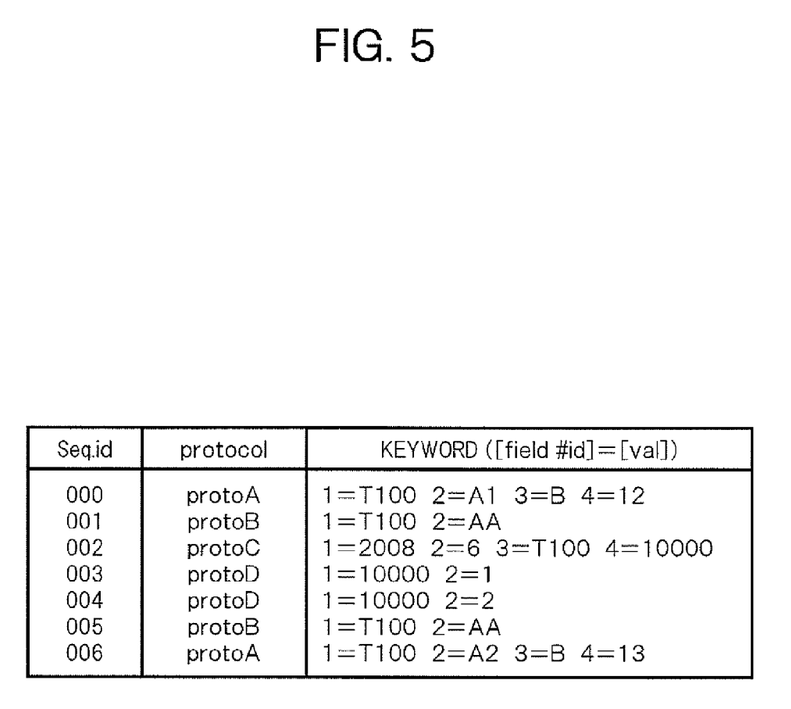
FIG. 5 is an explanatory view of keyword information in which linking keywords are extracted.

In step 4, linking keywords are all extracted from the message. Namely, from the message, the character strings described by "[field#id]=[val]" are all extracted, and as illustrated in FIG. 5, records associated with the sequence numbers, the protocols and the linking keywords are created. Then, the records are sequentially registered as keyword information to a table allocated in a storage device such as a memory. Incidentally, the keyword information illustrated in FIG. 5 indicates a state where all messages are extracted from one message log.

In step 5, it is judged whether or not all messages up to the last message in the message log are processed. Then, when all messages up to the last message are processed (Yes), the routine proceeds to step 6, whereas when all messages up to the last message are not processed (No), the routine returns to step 3.

In step 6, it is judged whether or not all message logs up to the last message log collected in the external storage device 20 are processed. Then, when all message logs up to the last message log are processed (Yes), the routine proceeds to step 7, whereas when all message logs up to the last message log are not processed (No), the routine returns to step 2.

Figure 6:
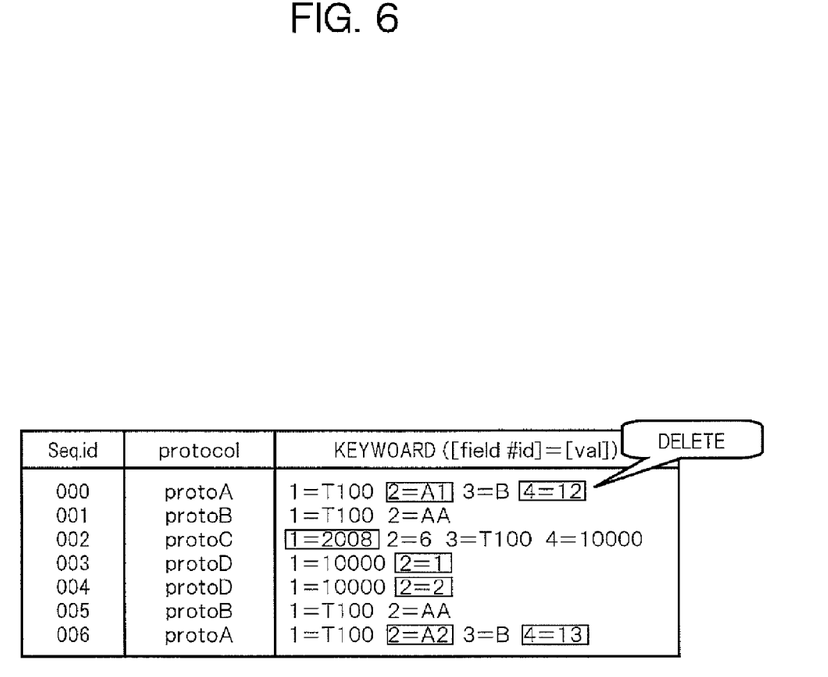
FIG. 6 is an explanatory view of a process of narrowing down the linking keywords.
Figure 7:
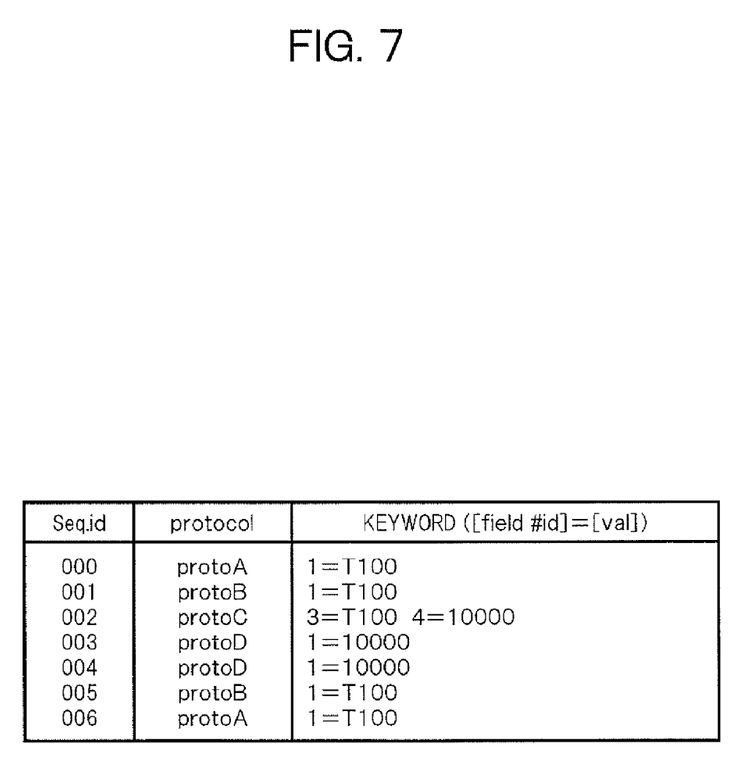
FIG. 7 is an explanatory view of keyword information in which the linking keywords are narrowed down.

In step 7, the linking keywords are narrow down. Namely, from the linking keywords in the keyword information, the linking keywords each existing only in its message as those surrounded by square lines in FIG. 6 are deleted. Then, as illustrated in FIG. 7, from the linking keywords remained in the keyword information, a minimum number of linking keywords capable of linking all of the messages is selected. Incidentally, in FIG. 7, since the messages 000, 001, 002, 005 and 006 are linked to each other with the linking keyword "T100", and also, the messages 002, 003 and 004 are linked to each other with the linking keyword "10000", it is possible to perform the linking process with two linking keywords "T100" and "10000".

Figure 8:
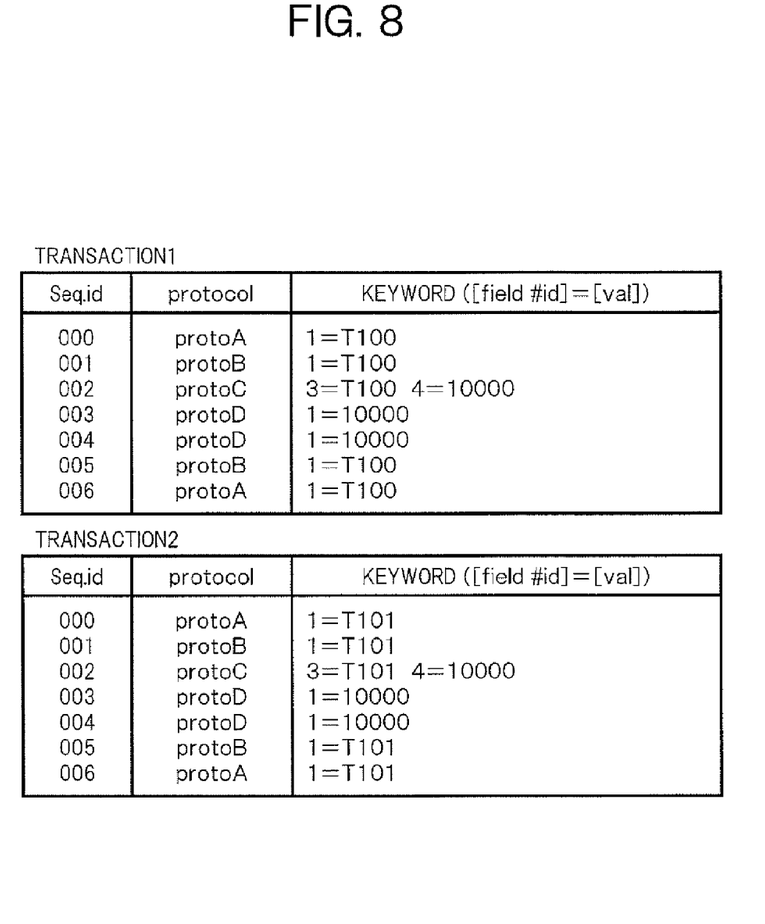
FIG. 8 is an explanatory view of a process of specifying the linking keywords based on the keyword information of each transaction.
Figure 9:
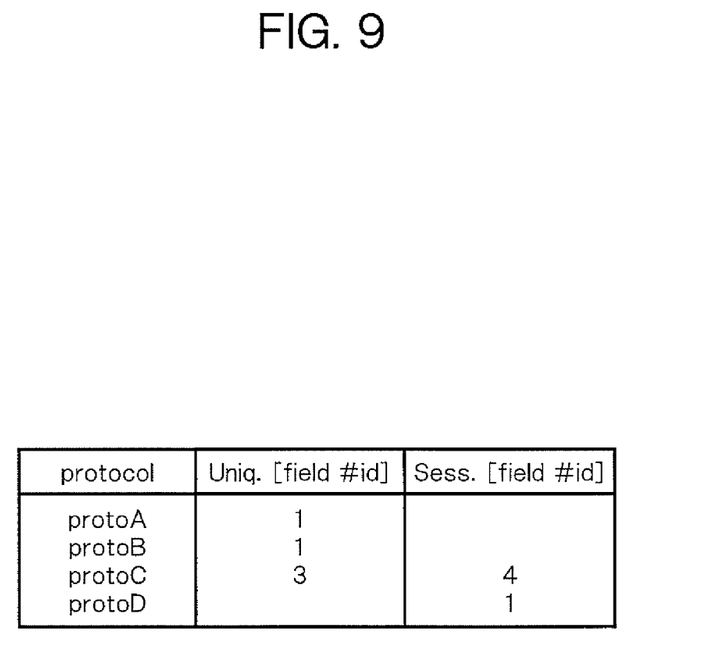
FIG. 9 is an explanatory view of linking keyword information for each protocol.

In step 8, information of linking keyword for each protocol is created. Namely, as illustrated in FIG. 8, the keyword information of the message logs relating to each transaction is compared with each other, and the linking keywords of values different from each other for each transaction are judged to be "evidently available" and the linking keyword of same value between the different transactions is judged to be "available". Incidentally, in the example illustrated in FIG. 8, the evidently available linking keywords are judged to be "T100" and "T101", and the available linking keyword is judged to be "10000". Then, as illustrated in FIG. 9, for each protocol, the evidently available linking keyword (Uniq.) and the available linking keyword (Sess.) are associated with the part [field#id] of the message entity for specifying protocols, to be stored as the information of linking keyword for each protocol.

By executing the first step described above, the linking keywords to be utilized for associating the messages with each transaction are extracted based on the results of the process executed on the same transaction for the plurality of number of times. At this time, in addition to the evidently available linking keywords (first character strings), the available linking keyword (second character string) is also extracted. Then, for each protocol, the information of linking keyword for each protocol in which the evidently available linking keywords and the available linking keyword are associated with the part [field#id] of the message entity for specifying protocols, is created.

Further, since the evidently available linking keywords and the available linking keyword are extracted for each protocol, the linking keywords are grouped, so that subsequent processes can be simplified.

Figure 10:
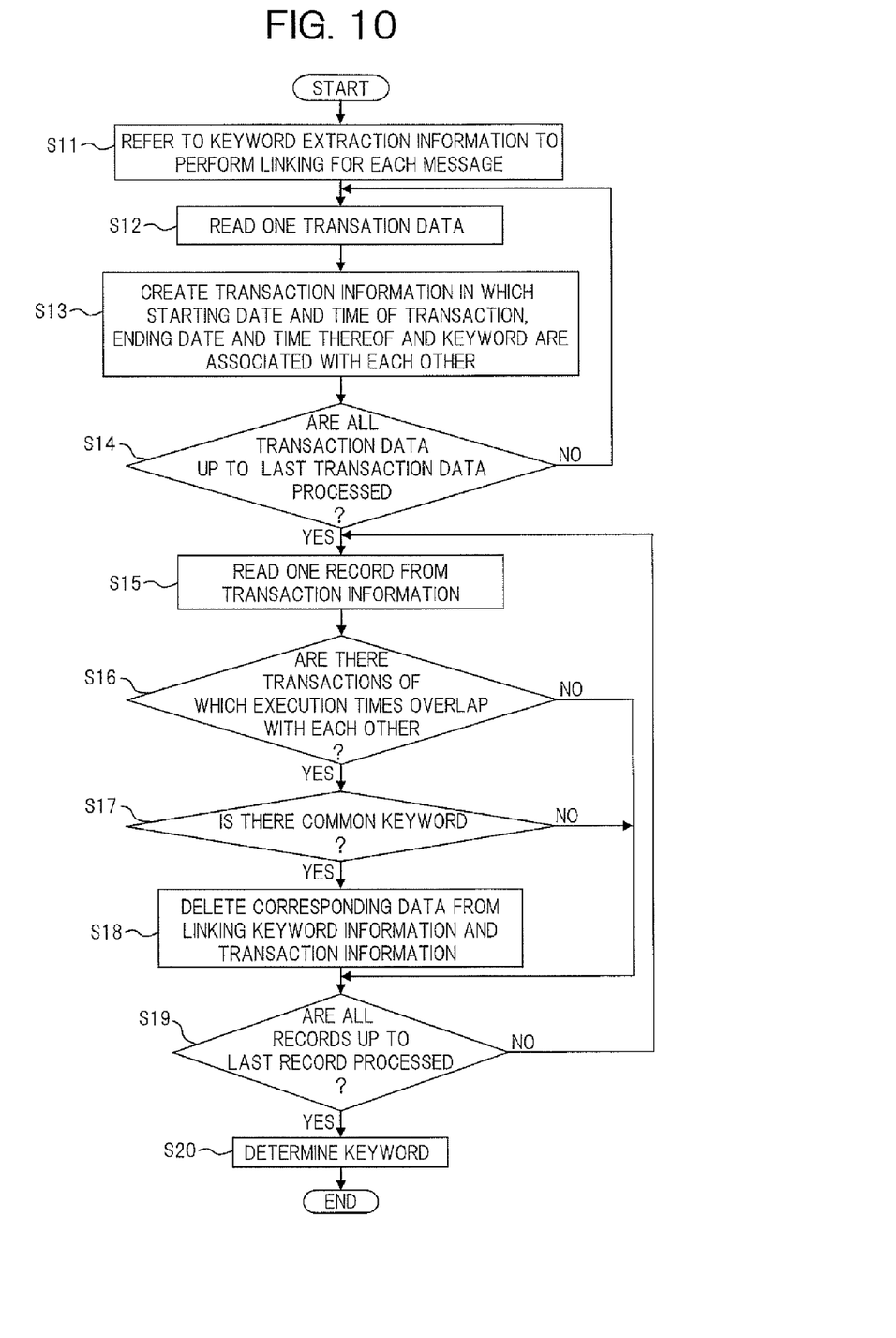
FIG. 10 is a flowchart illustrating a process content of a second step relating to the linking keyword extraction.

FIG. 10 illustrates a process content of a second step of extracting the linking keywords from message logs stored in the external storage device 20 and determining them according to an instruction of system administrator and the like. Here, as a result that the electronic commerce system 10 is practically operated after the execution of the first step, the message logs relating to the transactions are stored in the external storage device 20. Incidentally, the second step is executed in the keyword automatically extracting apparatus 30, so that keyword determining means is provided.

Figure 11:
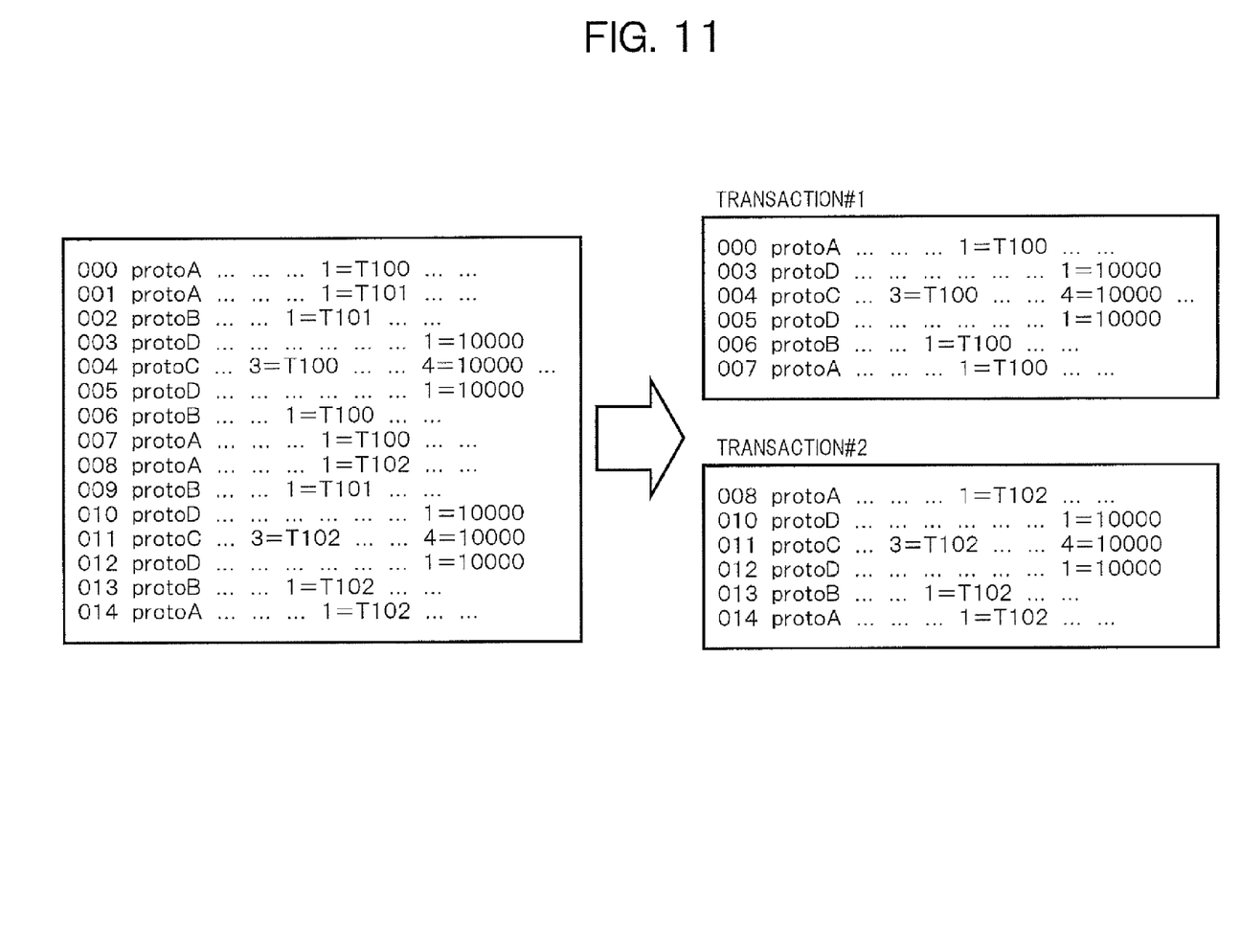
FIG. 11 is an explanatory view illustrating a state where a linking process for each transaction is performed in the second step.

In step 11, referring to the protocol linking keyword information, the linking of the messages in the message logs stored in the external storage device 20 is performed as illustrated in FIG. 11. Namely, the linking keywords are extracted from the message logs by using the values for specifying the linking keywords, and utilizing the extracted linking keywords, transaction data in which the respective messages are associated with each transaction is created.

In step 12, one transaction data is read.

Figure 12:
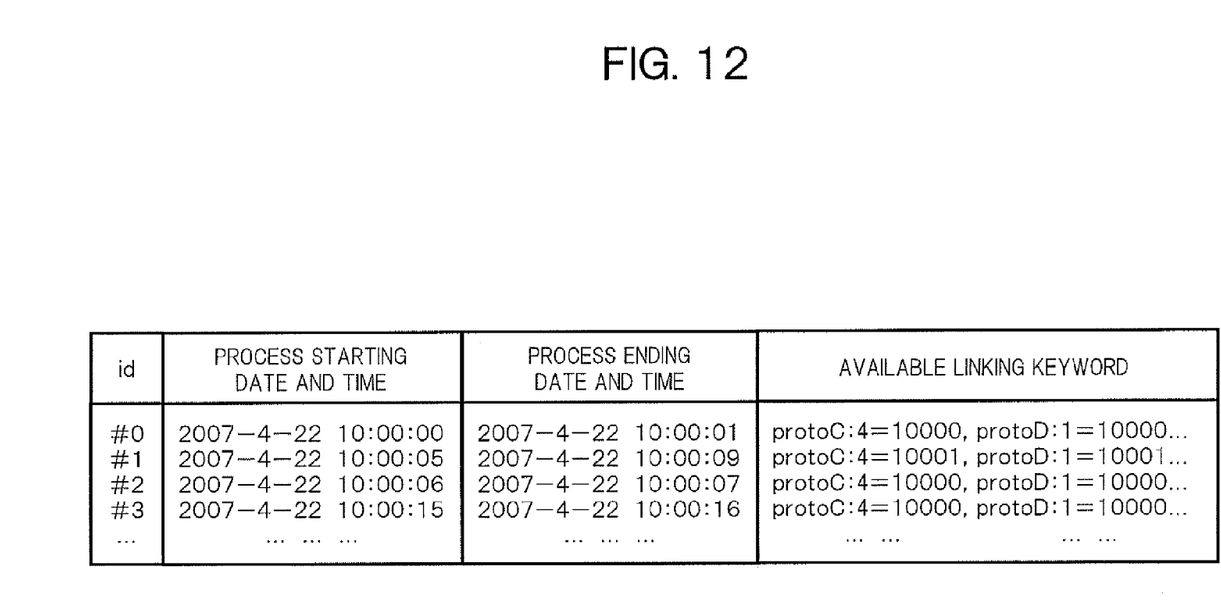
FIG. 12 is an explanatory view of transaction information.

In step 13, as illustrated in FIG. 12, records associated with identifiers (id) for identifying the transactions, process starting dates and times, process ending dates and times, and the available linking keywords are created. Then, the records are sequentially registered as transaction information to a table allocated in the storage device such as the memory. Here, the process starting date and time of the transaction, and the process ending date and time thereof may be acquired by referring to the time-stamp set in the header of the message relating to the starting and ending of the transaction. Further, referring to the protocol linking keyword information illustrated in FIG. 9, the available linking keyword may be appropriately extracted from each message.

In step 14, it is judged whether or not all transaction data up to the last transaction data is processed. Then, when all transaction data up to the last transaction data is processed (Yes), the routine proceeds to step 15, whereas when all transaction data up to the last transaction data is not processed (No), the routine returns to step 12.

In step 15, one record is read from the transaction information illustrated in FIG. 12.

In step 16, referring to the process starting date and time and the process ending date and time in the record, it is judged whether or not there is the transaction of which execution time overlaps with the process starting date and time and the process ending date and time. Then, when there is the transaction of which execution time overlaps with the process starting date and time and the process ending date and time (Yes), the routine proceeds to step 17, whereas when there is not the transaction of which execution time overlaps with the process starting date and time and the process ending date and time (No), the routine proceeds to step 19.

In step 17, it is judged whether or not there is the linking keyword common to the records of the transaction of which execution time overlaps with the process starting date and time and the process ending date and time. Then, when there is the common linking keyword (Yes), the routine proceeds to step 18, whereas if there is not the common linking keyword (No), the routine proceeds to step 19.

In step 18, the data relating to the common linking keyword is deleted from the information of linking keyword for each protocol and the transaction information.

In step 19, it is judged whether or not all records up to the last record in the transaction information are processed. Then, when all records up to the last record are processed (Yes), the routine proceeds to step 20, whereas when all records up to the last record are not processed (No), the routine returns to step 15.

In step 20, the linking keyword for associating the messages with each transaction is determined. Namely, the character string ([val]) continued from the character strings Uniq. and Sess. registered in the information of linking keyword for each protocol is determined from the message logs stored in the external storage device 20. Incidentally, for enabling it to be referred to at arbitrary time points, the lastly specified linking keyword may be written in a text format to an external storage device, or may be output from a printing device such as a printer, for example.

By executing the second step described above, it is judged whether or not the available linking keyword can be utilized, so that the final linking keyword is determined by considering the judgment result. Namely when the execution times of the different transactions do not overlap with each other, the same character string appearing in the different transactions is judged to be available as the linking keyword for associating the messages with each transaction.

Therefore, in addition to the character string which is unique for each transaction, the character string common to the transactions of which execution times do not overlap with each other, becomes available as the linking keyword for linking the messages. Accordingly, the precision of linking the message can be improved. Further, such a linking keyword is automatically extracted through the first and second steps, so that the labor for the extraction can be reduced. Consequently, administration cost-reduction can be achieved.

All examples and conditional language recited herein are intended for pedagogical purposes to aid the reader in understanding the invention and the concepts contributed by the inventor for furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing a linking keyword automatically extracting program that causes a computer to execute a procedure, the procedure comprising the steps of:
    referring to a first message log which includes a first plurality of network messages, each of the first plurality of network messages being transmitted or received among a plurality of servers in an information system and being stored when transaction corresponding to the each of the first plurality of network messages is processed a plurality of times;
    extracting character strings capable of being linking keyword candidates from each of the first plurality of network messages stored in the first message log;
    deleting the extracted character string that exists only in a specific message of the first plurality of network messages;
    selecting a first plurality of character strings, a number of the first plurality of character strings being minimum for sets of character strings that are capable of linking all of the first plurality of network messages;
    comparing each of the first plurality of character strings relating to the transactions, respectively, with each other, to thereby extract a first linking keyword which is an unique character string in each of the transactions and a plurality of second linking keywords which is a common character string to different transactions;
    referring to a second message log in which a second plurality of network messages are sequentially stored in accordance with an operation of the information system;
    associating messages in the second plurality of network messages by utilizing the first linking keyword and the plurality of second linking keywords and;
    deleting linking keyword of the plurality of second linking keywords that is common to the transactions of which execution times overlap with each other,
    wherein the referring refers to headers of the plurality of second network messages stored in the second message log and specifies process starting date, process starting time, process ending date, and process ending time for each of the transactions, to thereby judge whether or not execution times of the transactions overlap with each other.

2. The computer-readable, non-transitory medium according to claim 1,
    wherein the extracting character strings extracts the first character string and the second character string for each protocol.

3. A linking keyword automatically extracting method executed in a computer, the method comprising the steps of:
    referring to a first message log which includes a first plurality of network messages, each of the first plurality of network massages being transmitted or received among a plurality of servers in an information system and being stored when transaction corresponding to the each of the first plurality of network message is processed a plurality of times;

extracting character strings capable of being linking keyword candidates from each of the first plurality of network messages stored in the first message log;

deleting the extracted character string that exists only in a specific message of the first plurality of network messages;

selecting a first plurality of character strings, a number of the first plurality of character strings being minimum for sets of character strings that are capable of linking all of the first plurality of network messages;

comparing each of the first plurality of character strings relating to the transactions, respectively, with each other, to thereby extract a first linking keyword which is an unique character string in each of the transactions and a plurality of second linking keywords which is a common character string to different transactions;

referring to a second message log in which a second plurality of network messages are sequentially stored in accordance with an operation of the information system;

associating messages in the second plurality of network messages by utilizing the first linking keyword and the plurality of second linking keywords;

deleting linking keyword of the plurality of second linking keywords that is common to the transactions of which execution times overlap with each other; and referring to headers of the plurality of second network messages stored in the second message log and specifying process starting date, process starting time, process ending date, and process ending time for each of the transactions, to thereby judge whether or not execution times of the transactions overlap with each other.

4. A linking keyword automatically extracting apparatus comprising:

a storage medium storing instructions; and a processor configured to execute the instructions to refer to a first message log which includes a first plurality of network messages, each of the first plurality of network massages being transmitted or received among a plurality of servers in an information system and being stored when transaction corresponding to the each of the first plurality of network messages is processed a plurality of times, extract character strings capable of being linking keyword candidates from each of the first plurality of network messages stored in the first message log, delete the extracted character string that exists only in a specific message of the first plurality of network messages, select a first plurality of character strings, a number of the first plurality of character strings being minimum for sets of character strings that are capable of linking all of the first plurality of network messages, compare each of the first plurality of character strings relating to the transactions, respectively, with each other, to thereby extract a first linking keyword which is an unique character string in each of the transactions and a plurality of second linking keywords which is a common character string to different transactions, refer to a second message log in which a second plurality of network messages are sequentially stored in accordance with an operation of the information system, associate messages in the second plurality of network messages by utilizing the first linking keyword and the plurality of second linking keywords, delete linking keyword of the plurality of second linking keywords that is common to the transactions of which execution times overlap with each other, and refer to headers of the plurality of second network messages stored in the second message log and specify process starting date, process staring time, process ending date, and process ending time for each of the transactions, to thereby judge whether or not execution times of the transactions overlap with each other.

* * * * *